United States Patent [19]
Wong et al.

[11] Patent Number: 5,703,771
[45] Date of Patent: Dec. 30, 1997

[54] VHF INVERTER WITH SELF REGULATION FOR ANY LOAD

[75] Inventors: Wilbur E. Wong; David M. Lusher, both of Torrance; William B. Hwang, Los Angeles, all of Calif.

[73] Assignee: Hughes Electronics, Los Angeles, Calif.

[21] Appl. No.: 690,247

[22] Filed: Jul. 19, 1996

[51] Int. Cl.⁶ .................................................. H02M 7/538
[52] U.S. Cl. .................................................. 363/134
[58] Field of Search ........................ 363/24, 25, 16, 363/17, 131, 133, 134

[56] References Cited

U.S. PATENT DOCUMENTS

| | | | |
|---|---|---|---|
| 4,641,075 | 2/1987 | Asano et al. | 363/42 |
| 4,719,556 | 1/1988 | Wise | 363/56 |

*Primary Examiner*—Peter S. Wong
*Assistant Examiner*—Rajnikant B. Patel
*Attorney, Agent, or Firm*—Leonard A. Alkov; Wanda K. Denson-Low

[57] ABSTRACT

A VHF inverter including an inverter circuit (100) for providing an inverter output; a constant magnitude, variable phase impedance transforming circuit (54, 154) responsive the inverter; and a load circuit (55, 155) responsive to the impedance transforming circuit.

3 Claims, 2 Drawing Sheets

VHF INVERTER WITH SELF REGULATION FOR ANY LOAD

BACKGROUND OF THE INVENTION

The disclosed invention is directed generally to DC to AC inverters, and more particularly to a VHF DC to AC inverter that includes an impedance transform network that transforms a known load network into a substantially constant magnitude impedance so as to provide load regulation for fixed frequency operation.

DC to AC inverters are commonly employed in applications which require the conversion of DC power to AC power, including for example power supplies. DC to AC inverters have been designed to operate in the VHF range of frequencies since higher frequencies allow for significantly smaller passive components and also provide for faster feedback response to load perturbations.

For a given input voltage and output load impedance, one can design an inverter to deliver a desired power to the load. However, when the input voltage to the inverter of the load impedance seen by the inverter changes, the output power delivered to the load changes as well unless active regulation is utilized to regulate the output power. An output regulator to manage the output power for input voltage variation is complex and difficult to realized. The additional requirement of managing the output power for changes in the load characteristic would further add complexity to the regulator design.

SUMMARY OF THE INVENTION

It would therefore be an advantage to provide a passive means of regulating the output voltage of a VHF inverter for load changes.

Another advantage would be to provide an inverter load network that maintains high inverter efficiency for varying load conditions.

The foregoing and other advantages are provided by the invention in a VHF inverter that includes an inverter circuit for providing an inverter output, a constant magnitude, variable phase impedance transforming circuit responsive the inverter, and a load circuit responsive to the impedance transforming circuit.

BRIEF DESCRIPTION OF THE DRAWINGS

The advantages and features of the disclosed invention will readily be appreciated by persons skilled in the art from the following detailed description when read in conjunction with the drawing wherein.

DETAILED DESCRIPTION OF THE DISCLOSURE

Figure 3:
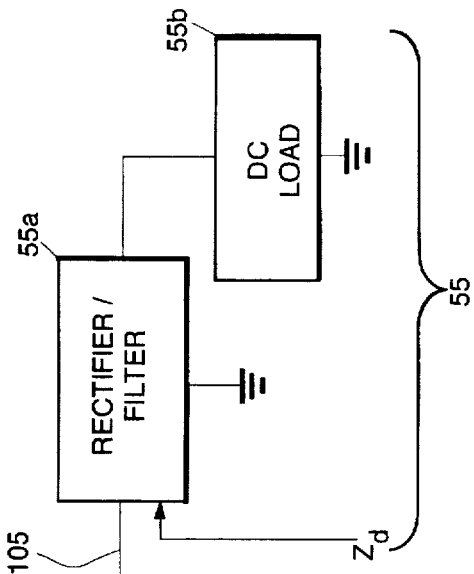
FIG. 3 is a Smith chart depicting a typical locus of input impedance of a rectifier circuit with a DC load as the DC load is varied from full ($R_{normal}$) to ⅛ load ($8 \times R_{normal}$). The chart also depicts a constant magnitude transformed impedance of the rectifier circuit with a DC load.

In the following detailed description and in the several figures of the drawing, like elements are identified with like reference numerals.

Figure 1:
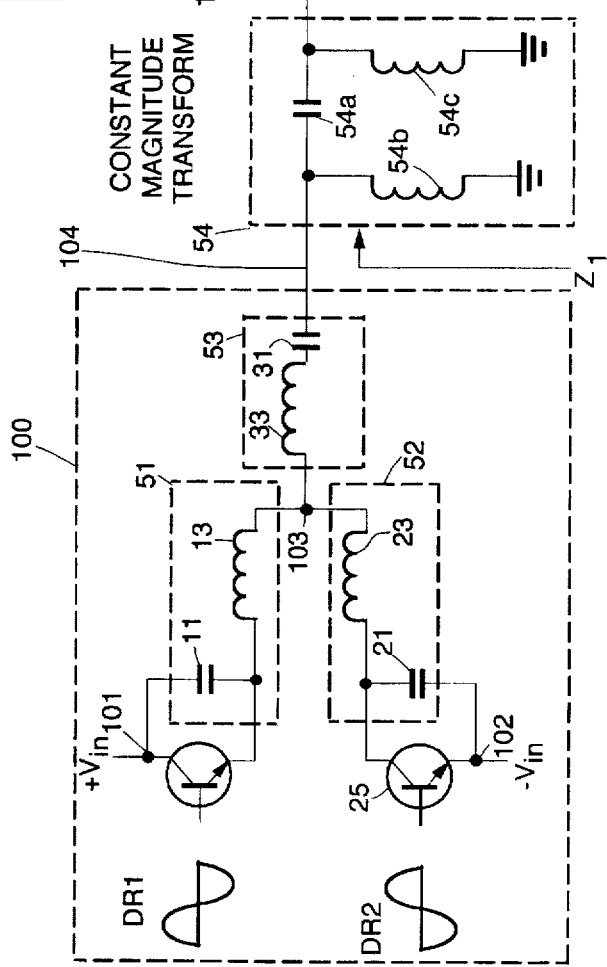
FIG. 1 is a schematic diagram of a series resonant half bridge VHF DC to DC converter that implements a VHF DC to AC inverter that includes an impedance transform network in accordance with the invention for an arbitrary load impedance such as a rectifier circuit with a DC load.

Referring now to FIG. 1, set forth therein is a schematic diagram of a DC to DC converter that includes a DC to AC inverter in accordance with the invention. The converter includes a first capacitor 11 having one terminal connected to a first supply node 101 which is connected to a supply voltage $V_{IN}$ that is positive relative to a ground reference. The other terminal of the first capacitor 11 is connected to one terminal of a first inductor 13 which has its other terminal connected to a central node 103. The collector terminal of a first NPN transistor 15 is connected to the first supply node 101, while the emitter of the first NPN transistor 15 is connected to the node between the first capacitor 11 and the first inductor 13. The base of the first NPN transistor 15 is driven with a first periodic drive voltage signal DR1 which has a predetermined frequency.

The first NPN transistor 15 comprises an active switch that provides an open circuit when it is open or non-conductive, and electrically connects the two terminals of the first capacitor 11 when it is conductive. The first capacitor 11 and the first inductor 13 comprise a first resonant circuit 51 that is configured to have a close to zero voltage across the first capacitor 11 when the NPN transistor 15 turns on.

The DC to DC converter of FIG. 1 further includes a second capacitor 21 having one terminal connected to a second supply node 102 which is connected to a supply voltage $-V_{IN}$ that is negative relative to the ground reference. The other terminal of the second capacitor 21 is connected to one terminal of a second inductor 23 which has its other terminal connected to the central node 103. The collector terminal of a second NPN transistor 25 is connected to the node between the second capacitor 21 and the second inductor 23, while the emitter of the second NPN transistor 25 is connected to the second supply node 102. The base of the second NPN transistor 25 is driven with a second periodic drive voltage signal DR2 which is of the same predetermined frequency as the first periodic drive voltage signal DR1, but is 180 degrees out of phase with respect to the first periodic drive voltage signal DR1.

The second NPN transistor 25 comprises an active switch that provides an open circuit when it is open or non-conductive, and electrically connects the two terminals of the second capacitor 21 when it is conductive. The second capacitor 21 and the second inductor 23 comprise a second resonant circuit 52 that is particularly configured to have a close to zero voltage across the second capacitor 21 when the second NPN transistor 25 turns on.

More particularly as to the drive signals DR1, DR2, the first and second inductors 13, 23 in the first and second resonant circuits 51, 52 prevent rapid buildup of current, which allows the transistors 15, 25 to be advantageously driven with a 50 percent duty cycle. Thus, the first and second periodic drive voltage signals DR1, DR2 can comprise sinusoids which are easily produced in the VHF range.

By way of illustrative example, the frequency of the periodic drive voltage signals DR1, DR2 is in the range of 30 MHz to 200 MHz. Since the transistors 15, 25 can be driven with a 50 percent duty, the first and second resonant circuits can be tuned, for example, to be in the range of 0.75 $F_0$ to 1.1 $F_0$, wherein $F_0$ is the frequency of the periodic drive voltage signals DR1, DR2 and thus the operating frequency of the DC to DC converter of FIG. 1. Since the resonant frequency of the first and second resonant circuits is close to the frequency of the periodic drive voltage signals DR1, DR2, the collector-emitter capacitances of the first and second NPN transistors 15, 25 are readily utilized with external capacitances to form the first and second capacitors 11, 21 of the resonant circuits.

A third inductor 33 and a third capacitor 31 are serially connected between the central node 103 and a node 104, and form a bandpass filter 53 that is tuned to the frequency of the periodic drive voltage signals DR1, DR2. A resonant impedance transform network 54 is connected between the node 104 and a node 105, and a rectifying load circuit 55 is connected between the node 105 and ground. The switches 15, 25, the capacitors 11, 21, the inductors 13, 23, and the bandpass filter 53 more particularly comprise a series-resonant half-bridge VHF DC to AC inverter 100 configured to supply power to the load circuit 55. In operation, the first and second NPN transistors 15, 25 alternating turn on and off, the first resonant circuit 51 comprised of the first capacitor 11 and the first inductor 13 resonates such that the voltage across the first capacitor 11 rings to close to zero when the first NPN transistor turns on; and the second resonant circuit 51 comprised of the second capacitor 21 and the second inductor 23 resonates such that the voltage across the second capacitor 21 rings close to zero when the second NPN transistor 25 turns on. Thus, when first periodic drive voltage signal DR1 makes a positive zero crossing and the second periodic drive voltage signal makes a negative zero crossing, the first NPN transistor 15 turns on and the second NPN transistor turns off. The voltage at the collector of the second NPN transistor 25 increases from $-V_{EE}$ to a maximum, and then decreases so as to reach $-V_{EE}$ as the second periodic drive voltage signal DR2 makes a positive zero crossing. Analogously, when the first periodic drive voltage signal DR1 makes a negative zero crossing and the second periodic drive voltage signal DR2 makes a positive zero crossing, the first NPN transistor 15 turns off and the second NPN transistor 25 turns on. The voltage at the emitter of the first NPN transistor 15 decreases from $V_{CC}$ to a minimum, and then increases so as to reach $V_{CC}$ as the first periodic drive voltage signal DR1 makes a positive zero crossing.

While the foregoing illustrative example includes NPN transistors 15, 25, it should be appreciated that the invention can be implemented with N-channel field-effect transistors.

Figure 2:
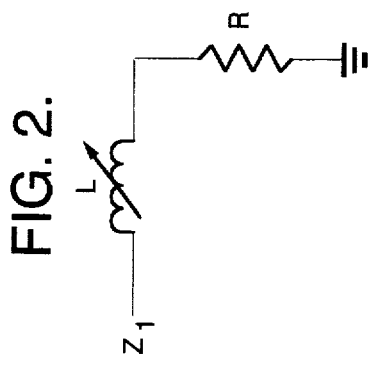
FIG. 2 is a schematic diagram of an equivalent circuit of the impedance seen by the inverter circuit of the inverter of FIG. 1.

The load circuit 55 comprises for example a rectifier/filter 55a and a DC load 55b, and has an impedance $Z_d$ that varies with the power utilized by the load circuit 55. The impedance $Z_d$ is arbitrary and is a function of the DC load 55b and the design of the rectifier/filter 55a of the load circuit 55. Thus, the impedance $Z_d$ can be characterized as the DC load 55b of the load circuit 55 is varied over the allowable range of full load to no load. In accordance with the invention, the resonant impedance transform network 54 is configured such that the impedance $Z_1$ seen by the series resonant half-bridge VHF DC-AC inverter 100 at the output of the bandpass filter 53 is the equivalent of a constant magnitude, variable phase angle series resistance and inductance (RL) circuit as the impedance $Z_d$ of the load circuit 55 varies in accordance with changes in the DC load 55b. FIG. 2 schematically illustrates the equivalent circuit seen by the inverter circuit 100 as a variable inductor and a variable resistor connected in series.

By way of illustrative example, the impedance transform network 54 comprises a series capacitor 54a connected between the output of the bandpass filter at the node 104 and the input of the load circuit 55 at the node 105, a shunt inductor 54b connected between the node 104 and the ground reference potential, and a shunt inductor 54c connected between the node 105 and the ground reference potential. A network having the topology of the impedance transform network 54 is sometimes called a high pass pi network.

It is noted that it is possible to set up a transform that satisfies the above constraints to yield a series resistance and capacitance (RC) equivalent circuit. However, the VHF inverter circuit 100 output power behavior is such that an RC network would produce the opposite of the desired effect. That is, as the DC load of the load circuit decreases, the power delivered to the load would increase. Moreover, the RL equivalent load network maintains a near zero voltage switching characteristic for the inverter, thus providing both high efficiency and regulation of load variations, both of which cannot be provided by the series RC equivalent circuit.

Referring more particularly to the equivalent RL circuit of FIG. 2 seen by the inverter 100, the magnitude of the impedance $Z_1$ seen by the inverter 100 is ideally a constant k. Thus, the sum of the squares of the inductive reactance and the resistance at the operating frequency should a constant $k^2$. Therefore, the phase angle between the voltage and current of this network is the arctangent of the ratio of the inductive reactance, at the operating frequency, to resistance. However, for an arbitrary DC load circuit 55, the condition of the magnitude of the impedance $Z_1$ equalling k can be satisfied at only 2 points because of the non-linear nature of the load circuit 55. The design thus is finding a set of $Z_1$ points for a given $Z_d$ behavior such the root mean square of the error between the magnitude of $Z_1$ and desired constant is minimized.

The resonant impedance transform network 54 is more particularly designed, for example, by characterizing the impedance of the load circuit 55 as a function of power delivered to the DC load 55b. Then, two impedance values, for example one at full load and the other at light load, are used to calculate the required values of the exemplary three component impedance transform network. Three constraints are needed to determine uniquely the values of the three components of the impedance transform network: at full load, the real part of the impedance $Z_1$ is the desired constant k; at full load, the imaginary part of the impedance $Z_1$ is zero; and at light load, the magnitude of the impedance $Z_1$ is again the desired constant k. FIG. 3 sets forth a Smith chart for a typical load impedance $Z_d$ and the resulting transformed impedance $Z_1$ with full load and quarter load values used as constraining points.

Figure 4:
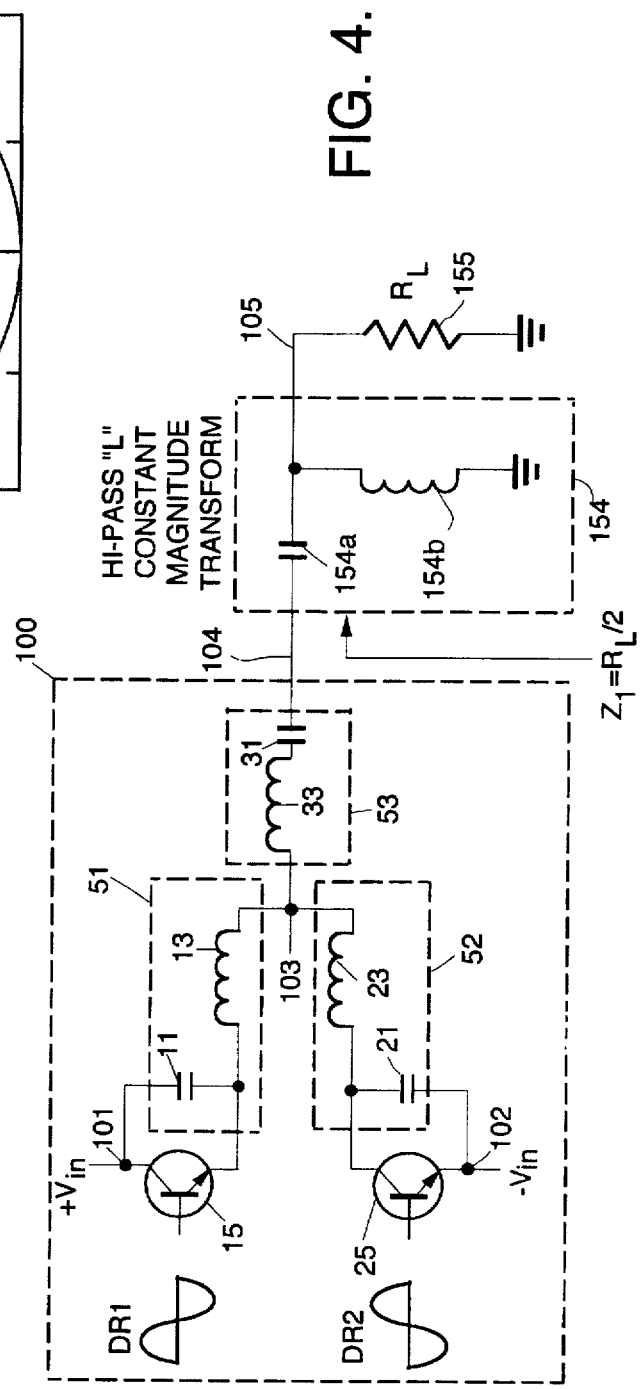
FIG. 4 is a schematic diagram of a series resonant half bridge VHF DC to AC inverter that includes an impedance transform network in accordance with the invention for a purely resistive AC load.

Referring now to FIG. 4, set forth therein is a schematic diagram of a DC to AC inverter in accordance with the invention which includes a VHF inverter 100 that is substantially identical to the VHF inverter 100 of FIG. 1, a resonant impedance transform circuit 154 responsive to the VHF inverter 100, and a resistive load circuit 155 that is responsive the impedance transform circuit 154. In accordance with the invention, the resonant impedance transform circuit 154 is configured such that the impedance seen by the series resonant half-bridge VHF DC-AC inverter 100 at the output of the bandpass filter 53 is the equivalent of a constant magnitude, variable phase angle RL circuit as shown in FIG. 2. By way of illustrative example, the resonant impedance transform circuit 154 comprises a series capacitor 154a connected in series between the bandpass filter 53 and the load circuit 155, and a shunt inductor 154b connected in parallel with the load circuit 155.

Essentially, FIG. 4 depicts a special case of the circuit of FIG. 1 wherein the load circuit 55 (FIG. 1) is purely resistive as shown in FIG. 4 as the load circuit 155. Under this condition, and with the choice of the impedance transform ratio of 0.5, the impedance transform network 54 of FIG. 1 can be realized with a series C and shunt L as shown in FIG. 4 as the impedance transform network 154. A network having the topology of the impedance transform network 154 is sometimes known as a high pass L network. Specifically at the operating frequency, the capacitive reactive of the capacitor 154a is half of the resistance $R_L$ of the load circuit 155 while the inductive reactance of the inductor 154b is equal to the resistance $R_L$ of the load circuit 155. Thus, the magnitude of the impedance $Z_1$ seen by the output of the VHF DC-AC inverter 100 in FIG. 4 is half of the load resistance $R_L$.

Figure 5:
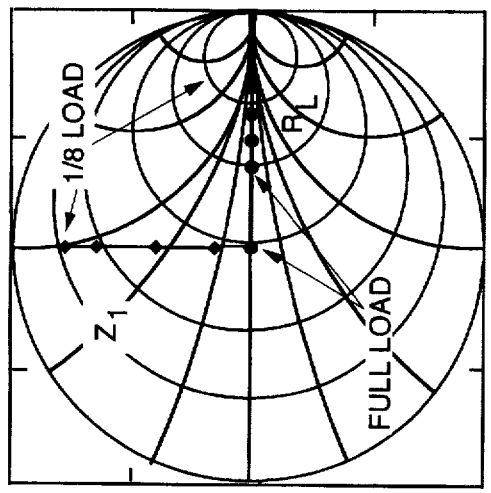
FIG. 5 is a Smith chart depicting a typical locus of a purely resistive AC load as it is varied from full to ⅛ load. The chart also depicts a constant magnitude transformed impedance of the purely resistive AC load.

As shown in the Smith chart of FIG. 5, the resistance $R_L$ of the load circuit 155 is purely resistive with no reactive components. The high pass L impedance transform network 154 transforms the $R_L$ locus to a $Z_1$ locus of points that satisfy the condition of constant magnitude with variable phase angle impedance.

The foregoing has thus been a disclosure of VHF inverters having passive circuitry that advantageously regulates output voltage and maintains high inverter efficiency for varying load conditions.

Although the foregoing has been a description and illustration of specific embodiments of the invention, various modifications and changes thereto can be made by persons skilled in the art without departing from the scope and spirit of the invention as defined by the following claims.

What is claimed is:

1. A VHF DC to AC inverter for providing power to a load circuit, the VHF DC to AC inverter comprising:

switching inverter means connected between first and second voltages for providing an inverter output; and impedance transforming means connected between the switching inverter means and the load circuit, said impedance transforming means configured to present an input impedance having a magnitude that is substantially constant with variations of the load circuit, and a phase angle that varies with variations of the load circuit, said impedance transferring means comprising:

(i) a series capacitor connected between an output of the switching inverter means and an input of said load circuit, (ii) a first shunt inductor connected between a first terminal of said capacitor and a reference potential, and (iii) a second shunt inductor connected between a second terminal of said capacitor and the reference potential.

2. The DC to AC inverter of claim 1 wherein said impedance transforming means is configured such that its input impedance is substantially similar to an inductor and a resistor connected in series.

3. The DC to DC converter of claim 1 wherein the load circuit is substantially purely resistive, and wherein said impedance transforming means comprises a series capacitor and a shunt inductor.

* * * * *

UNITED STATES PATENT AND TRADEMARK OFFICE
CERTIFICATE OF CORRECTION

PATENT NO : 5,703,771

DATED : December 30, 1997

INVENTOR(S): Wilbur E. Hong, David M. Lusher and William B. Hwang

It is certified that error appears in the above-identified patent and that said Letters Patent is hereby corrected as shown below:

On the title page, item [75],
Wilbur E. Wong should instead be Wilbur E. Hong

Signed and Sealed this

Twentieth Day of June, 2000

Attest:

Q. TODD DICKINSON

*Attesting Officer*  *Director of Patents and Trademarks*